Patented Aug. 17, 1948

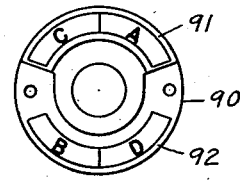
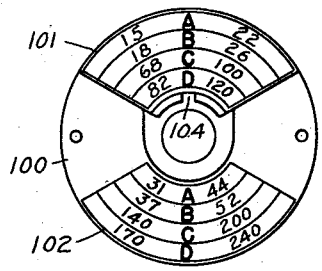

2,447,317

UNITED STATES PATENT OFFICE 2,447,317

GEAR CHANGING MECHANISM FOR SHAPING MACHINES

Granger Davenport, Montclair, N. J., assignor to Gould & Eberhardt, Incorporated, Irvington, N. J., a corporation of New Jersey Application October 18, 1945, Serial No. 623,052

5 Claims. (Cl. 74—342)

The present invention relates to shaping machine tools and is concerned more particularly with the shaper ram driving transmissions and their controls.

A primary aim of the invention is to obtain, in a machine of this class, a wider selection of incrementally closer speed-changes than has heretofore been considered practical, in combination with a simple method and means of selecting and shifting the speed-change gears, thereby to render available an improved shaping machine having the capacity, range, and ease of control essential to meet current needs of industry.

A further aim of the invention is to render available a shaping machine in which the shaper ram may be operated at any one of 16 different speeds, and in which the average increment between changes is approximately only 19%. A shaper transmission designed in accordance with this invention, enables the operator to select more closely the proper tool speed and thereby take advantage of the full capabilities of the tool with respect to each particular grade and quality of the material to be operated upon. With the prior commercial machines the speed-changes were relatively few and coarsely graded so that only a rough approximation of the proper tool speed was obtainable and the quality of tooling and rate of production on such machines, has suffered.

In carrying out the objectives of this invention it is proposed to construct three speed-change mechanisms in series within the main frame of the machine in such a way that sixteen selective speeds are readily available and with only four pairs of gear teeth in contact at any one time. Briefly, the primary change speed mechanism of the series is arranged to afford two relatively fine changes in speed, the secondary speed change mechanism is arranged to afford four additional and medium changes, and the tertiary or back-gear speed change mechanism is arranged to afford two additional and coarse changes, making a total of sixteen speeds available. A further feature of the invention resides in an improved arrangement of the gear shifting controls, more specifically in the provision of but two control levers for effecting, with the three series mechanisms, any one of the sixteen speeds, each lever having completely selective movements in two directions and controlling four speed changes. By way of additional improvement, the gearing of the three series transmissions are arranged so that any speed may be quickly selected without going through the intermediate changes.

Toward increasing the machine production capacity and to aid the operator in setting the machine for a given type of work, one of the control levers is connected and adapted to operate the shiftable gear unit of the back gears (coarse changes) as well as the shiftable unit of the primary set (fine changes). Accordingly, with a machine embodying this invention, the operator may quickly change from a relatively slow speed to a relatively high speed, or effect a small change in either, by actuating only one of the levers. Set-up and operating time can thereby be measurably shortened for the more frequently used changes are controlled by one lever.

Cooperatively related with the gear shift control levers, improved direct reading indicator dial means have been provided whereby the operator can instantly determine the speeds available and in what positions to place either or both levers to obtain a desired machine speed. As the several speed change mechanisms are in series, the positioning of the respective shiftable gears thereof jointly determine the final speed, and it is convenient, therefore, with a two lever control, to associate a dial with each lever and to indicate thereon the setting or position required of the respective levers, and to arrange and mark one of the dials to show the required positions of both of the controls and the 16 different rates of speed that are obtainable by their proper manipulation.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Fig. 2 is a transverse sectional view of the machine illustrating the gearing in developed form more clearly to show the mating gears of the several series related change-speed mechanisms.

Figs. 3 and 4 are plan views, on an enlarged scale, of an improved form of speed indicating dials for a two-lever 16-speed control.

Figure 1:
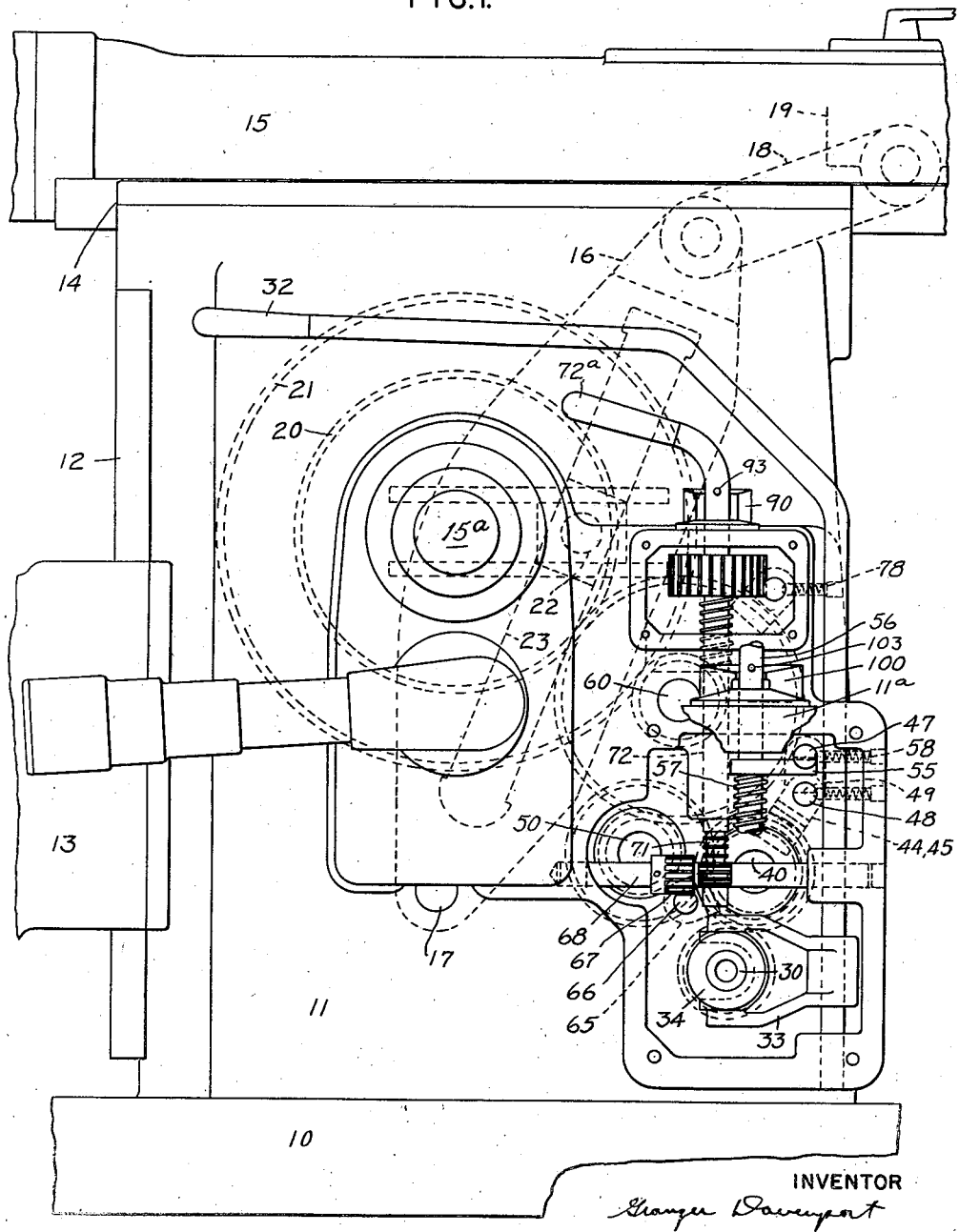
Figure 1 is a side view of portions of a shaping machine embodying this invention.

Referring to the drawings, the part numbered 10 represents the shaping machine base from which rises a main frame 11. The front of the frame has vertical guides 12 thereon and along which the shaper cross-rail 13 is mounted for vertical adjustment. The rail 13 supports the usual laterally adjustable work table (not shown) which is power fed laterally in a conventional manner. The top of the main frame 11 is provided with V-ways 14 which support and guide a ram 15. The ram 15 is adapted to carry at its forward end the usual shaper tool head, clapper box, tool post and tool, as will be understood, and as such parts have no direct bearing upon the ram reciprocating transmission they have not been illustrated.

The ram driving means comprises in part a slotted pitman lever 16, whose lower end is pivoted at 17 to the main frame. The upper end of the lever is connected to a link 18 which in turn connects to the ram through the medium of an adjustable bearing block 19. The main portions of the pitman sweep across the face of a pair of large crank gears 20 and 21 both of which are mounted on the shaper crank gear shaft 15ᵃ. Gear 21 carries a radially adjustable crank pin 22 that operates in a slide block fitted to the slot 23 in the pitman lever. Shaft 15ᵃ is a power take-off shaft. As the crank gears revolve, the pivoted pitman is caused to oscillate and in so doing, to propel the ram and its tool back and forth across the work. If desired, reference may be had to the patents to Zimmermann Nos. 1,960,565 and 2,077,730 for additional details concerning the work table feed means and the parts thus far mentioned.

The primary aim of the invention is to provide in a machine of this character, a relatively large number of closely graded speed changes with a simple method of shifting, so that the operator can readily and with ease obtain the best cutting speed for a given operation. In a machine constructed in accordance with this invention, 16 speeds have been made available, employing but two levers for shifting and whereby closer and more exact control of rate, without confusion in the selecting thereof, has been made possible. A preferred manner in which these results have been accomplished, is illustrated most clearly in the sectional view shown by Fig. 2. In this figure, the lowermost shaft 30 is the main drive or power shaft that brings power into the machine and the housing 31 contains a main drive pulley and master clutch. The pulley and clutch are of conventional design and, therefore, not shown. The clutch is operated from the operator's side of the machine by means of a main control lever 32.

The lower end of the lever 32 is connected by a fork 33 with a combined brake and clutch shifter spool 34. When the main clutch is effective the power in shaft 30 is transmitted to a second parallel shaft 40, through a primary set of change gears X. Shaft 40 is adapted to transmit power to a third parallel shaft 50, through a secondary change speed set marked Y, and the power in shaft 50 is transmitted to the crank gears 20, 21 through a third change-speed set marked Z. The change-speed mechanisms X, Y and Z, are in series with one another, the first set yielding two speeds; the second set 4 speeds, and the third set two speeds, making 16 speeds in all available.

The primary speed change mechanism X comprises a double-gear unit 35 secured to the shaft 30, and a slidable double-gear unit 46 that is splined to the shaft 40. The slidable unit 46 has two effective positions, right (as shown), and to the extreme left from the position illustrated. These gears being the furtherest from the output end of the transmission, are arranged to provide two relatively fine changes in speed. Representative gear ratios for the gears of the set X are $$\frac{30}{36}T \text{ and } \frac{33}{33}T, 9P^D$$

The second speed change mechanism Y, referred to also as transmission gears, is composed of two double gear, independently slidable, units 41 and 43 splined upon the shaft 40. Complementary double gear units 52 and 54, fixed upon the shaft 50 complete the set, and together afford four medium changes in speed in series with those of the speed change set X. The gears of this set are, for example, rationed $$\frac{21}{26}, \frac{26}{41}, \frac{32}{35}, \frac{38}{29}, 8P^D$$

The shaft 50 is furnished with a wide faced pinion gear 51 which is continuously meshed by a gear 62 of a double gear slidable unit 63 mounted upon the shaft 60. The other gear 64 of the slidable unit is illustrated in mesh with the large crank gear 21. When the unit 63 is shifted along the shaft 60 to its other extreme position (to the right) the gear 64 is moved out of mesh with the crank gear 21 and the gear 62 of the shiftable unit is brought into mesh with the smaller crank gear 20 while continuing in engagement with the wide faced pinion 51. This change speed set, referred to also as back gears, provide two relatively coarse changes in speed thereby doubling the eight moderate changes obtainable with the change-speed sets X and Y. The back gears, in effect, divide the 16 speeds into one group of 8 speeds and another group of 8 speeds. The gear ratio yields a total of sixteen speeds which differ by an average increment of approximately 19%.

The shafts 30, 40, and 50 are journaled against endwise movement in anti-friction radial thrust bearings 35 and 36 fitted to recesses in the main frame 11. Threaded bushings 37 are provided to lock the parts in position. The crank gears 20, 21 are secured to a relatively large hub member 70 that is journaled in the main frame wholly to one side of the plane of the gears, whereby the inner side of the gear 21 is cleared for the oscillation of the pitman lever 16 across the center thereof.

In the three serially related change-speed mechanisms referred to there are four independently, and selectively shiftable compound gear units 46, 41, 43 and 63, each having two effective positions. Gear units 41 and 43, however, each has also an intermediate or neutral position, for only one gear of those four can be effective at any one time.

Referring first to the shiftable units of the transmission gears, set Y, each unit 41, 43 thereof is straddled by a shifter fork 44 and 45, respectively. Each shifter fork is secured to an axially movable shaft 47 and 48, respectively, which are journaled in bearings provided by the main frame. The shafts 47 and 48 extend toward the operator's side of the machine and are notched out as at 49 to receive, selectively, the end of an actuating lever 55. The lever 55 is secured to a rotatable and axially movable control shaft 56 journaled in a cover member 11ᵃ.

The upper end of the control shaft 56 is bent laterally and provides the operator with a hand grip portion 56ᵃ. The shifter rods 47 and 48 are, as illustrated in the drawings, relatively closely spaced apart, and only when the notches 49 in their ends are aligned with one another (gear units 41 and 43 in neutral positions) may the actuating lever 55 be shifted vertically from one notch to the other. When the lever 55 is engaged in the notch in one of the shifter rods, a turning of the control shaft angularly effects a lateral shifting of one of the gear units 41, 43 to one of its effective positions. A compression spring 57, underlying the actuating lever 55, absorbs the weight of the lever and the shaft 56. Spring pressed ball detent means 58 cooperatively related to three V-notches provided in each of the shifter shafts 47, 48, serve as position indicating and retaining means for each of the three positions of the respective shiftable gear units 41, 43. With the control means arranged as described, an interlocking of the shifter rods automatically is effected which prevents simultaneous or concurrent shifting of both shiftable units of the speed change mechanism Y.

Such an interlocking is not required in respect to the shiftable units of the change speed sets X and Z, for the reason that the shiftable units thereof are in different, tho serially arranged, change speed transmissions. With a view toward simplification of the controls, the control lever for the primary change speed set X, is arranged also to control the back gear set Z, and to have rotary and axial movement similar to the movements of the control shaft 56 previously explained.

Referring to Fig. 2, the shiftable compound gear unit 46 of the primary speed change set X, is straddled by a shifter fork 65 that is carried by a shiftable rack bar 66. The outer toothed end of the rack bar is meshed by the teeth of a gear 67 which is pinned to a transverse shaft 68. The shaft 68 also has pinion teeth 69 therein which are continuously meshed by annular rack teeth 71 provided on a vertically extending control shaft 72. Vertical movement of the control shaft 72 will, it will be apparent, effect a lateral shifting of the slidable gear unit 46. Spring pressed ball detent means 73, in cooperation with annular V-grooves 74, indicate and retain the control shaft in shifted position, while allowing for unrestricted angular movement thereof in either axial position.

The referred to rotational movement of the control shaft 72 is, in this embodiment of the invention, utilized to effect shifting of the back-gear shiftable unit 63. To that end, the upper portion of the control shaft 72 has secured thereto a wide faced pinion gear 75 that meshes continuously with rack teeth cut upon a back-gear shifter shaft 76. The shaft 76 is journaled in bearings provided by the main frame and cover elements of the machine, and carries a shifter fork 77 that straddles the gear 62 of the slidable unit. Rotary motion of the control shaft 72, will through the rack and pinion mechanism described, effect a shifting of the slidable back gear unit, without disturbing the position of the shiftable unit 35 of the primary change speed set X. Spring pressed ball detent means 78 and V-notches 79 formed in the rack shaft 76, indicate and retain the back gear unit 63 in shifted position. The upper end of the control shaft 72 is laterally bent and provides a hand grip portion 72a for effecting the rotary and axial shifting thereof. The weight of the control shaft 72 is absorbed by a compression spring 80 positioned under the pinion 75.

With the foregoing described control, axial movement of the control shaft 72, effects shifting of the gears of the primary set X and effects fine changes in speed, and rotational movement of the control shaft independently effects shifting of the back gear set Z and effects coarse changes in ram speed. This arrangement has the advantage not only of a single lever control for two series arranged change speed mechanisms, but the further advantage of enabling the operator to change quickly from low speed to high speed, or to obtain only a small change in the rate of tool movement when in either the high or low speed range, by actuating but a single lever.

As operation of the two control levers 56a and 72a is required to effect a given ram speed, an improved form of dial indicating means is provided to assist the operator in obtaining the proper selection and positioning of the levers. Associated with each lever is a two-level dial plate; plate 90 surrounds the control shaft 72 and plate 100 surrounds the control shaft 56. The upper level 91 of plate 90 is divided into two segments A and C and the lower level 92, is divided into two segments B and D. Preferably the segments are painted contrasting colors such as red and yellow, and blue and black, respectively. A double ended pointer 93 is carried by the control shaft 72 which, when positioned in the plane of the upper level 91 of the dial and turned to A or C, indicates that the primary gears and back gears are shifted to A range or C range. If the control shaft is shifted axially downwardly, the other end of the pointer aligns with the level 92 of the dial and indicates speed ranges B or D. The A and B ranges, in this embodiment, comprise the relatively low speed group and the C and D ranges the relatively high speed group, and the average difference between groups is relatively great, whereas, as between the speeds of ranges A and B and as between the speeds of ranges C and D, the increments of speed change are relatively small. In other words, rotation of the control shaft 72 effects the coarse changes, and axial shifting of the control shaft effects the fine changes.

The markings A—D of the indicating dial 90 are carried over to the dial 100, which also is formed in two levels 101, 102, and the group of legends A—D is marked upon the upper level as well as upon the lower level, as shown in Fig. 4. The control shaft 56 (for the transmission gears Y) carries a double-ended pointer 103 that operates through a central slot 104 in the plate when shifting the shaft axially from the upper level to the lower level and which can occur only when both gear units 41 and 43 are in intermediate or neutral positions. As illustrated in Fig. 4, the 16 rams speeds, in strokes per minute, are applied to the dial 100 in radiating rows indicative of the angular position required of the control shaft pointer 103, in each of its vertically adjusted positions.

The machine is controlled as follows: With the back-gear lever 72a positioned, for example, in range A, and the intermediate gear lever 56a directed toward the radial column headed by the number 15, the ram speed will be 15 strokes per minute. This machine speed may be changed slightly, by shifting the back gear control handle 72a downwardly (to range B) giving 18 strokes per minute, or the rate may be greatly increased by rotating the handle 72a from range position A to position C. If an intermediate but greater increment of rate change is desired, the other control handle 56a is rotated or shifted axially to bring the pointer thereof in registry with a selected row of speed markings, the particular speed resulting being the one indexed by one of the characters A—D, preselected by the control lever 72ª. Any speed, within the capacity of the machine, may be obtained by the conjoint operation of the two control levers, without proceeding through an intermediate or series of intermediate changes. Customarily, however, the operator will disengage the power from the machine by operating the clutch control lever 32, before attempting to shift the gears.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A shaping machine combining a transmission embodying but three serially related sets of change-speed mechanisms for reciprocating the ram at any selected one of sixteen speeds, each of said first and third sets of change speed mechanisms of the series affording but two changes in speed, and the intermediate set of change-speed mechanisms affording but four changes in speed, control means for the intermediate change speed mechanisms, and control means common to both the first and third sets of change speed mechanisms of the series embodying a rotatable and axially movable lever and connections therewith responsive to rotational movement of the lever to one of the change-speed mechanisms, and additional connections therewith responsive to axial movements of said lever to the other of the change-speed mechanisms.

2. Shaping machine drive and control means combining a main drive power shaft, a second shaft in parallelism therewith, power transmitting gearing between said shafts comprising but two gears fixed to said power shaft and a compound shiftable gear unit splined to said second shaft and adapted for meshing selectively with said fixed gears and affording but two relatively fine changes in speed; a third shaft and power transmitting gearing between said second and said third shaft comprising but four gears fixed to the said third shaft and a pair of compound shiftable gear units splined to said second shaft and adapted for selective meshing with the gears on said third shaft and affording but four intermediate changes in speed; a shaper crank gear shaft and power transmitting gearing between said third shaft and said crank gear shaft comprising a shiftable compound gear unit operative to transmit power from said third shaft to said crank gear shaft and affording but two relatively coarse changes in speed, and control means adapted for manual operation to shift the said shiftable gear units comprising two levers each operatively connected to but two of said four shiftable units and conjointly operable to obtain any one of the sixteen speeds available.

3. In a shaping machine embodying three serially arranged change-speed mechanisms affording respectively but two changes in speed, each relatively fine; but four changes in speed, each relatively medium; and but two changes in speed, each relatively coarse; the combination of a single lever control means for effecting the two fine as well as the two coarse changes, and a second single lever control means for effecting the four medium changes, and indicator means associated with one of said levers for indicating the operating positions required of both of said levers for machine operation at any of the sixteen rates of speed available with said series transmissions.

4. A shaping machine having but three distinct sets of change speed mechanisms in series for propelling the shaper ram and in which the first and third sets of change-speed mechanisms each embody a compound shiftable two gear unit, and the intermediate change-speed mechanism embodies two compound shiftable two gear units, each of the shiftable units of said change speed mechanisms having two selectively effective positions, combining means comprising a rotatable and axially shiftable control lever operatively connected with the shiftable units of said first and third change-speed mechanisms for shifting said units selectively, and a second rotatable and axially shiftable lever adapted to be operatively connected with either of the shiftable units of said intermediate change speed mechanism for shifting the said unit to an effective position selectively, means associated with each of said levers indicating the speed ranges when said levers are in their respective axial positions, and direct reading speed indicator means associated with one of said levers indicating the particular speed obtainable when both of said levers are in a given rotary and axial position.

5. In a shaper; a power-shaft; a first, a second and a third intermediate shaft each of said shafts being rotatably mounted; two unitary pairs of change gears between the power-shaft and the first intermediate shaft; four unitary pairs of change gears between the first and second intermediate shafts and rotatable therewith; a pair of reduction gears between the second and third intermediate shafts; a power take-off shaft; and reduction gears affording two speed changes directly between the third intermediate shaft and said power take-off shaft.

GRANGER DAVENPORT.

REFERENCES CITED

The following references are of record in the file of this patent:

UNITED STATES PATENTS

| Number | Name | Date |
|---|---|---|
| 1,817,724 | Van Hamersveld | Aug. 4, 1931 |
| 1,938,906 | Hoelscher | Dec. 12, 1933 |
| 1,982,612 | Hoelscher | Nov. 27, 1934 |
| 2,077,730 | Zimmerman | Apr. 20, 1937 |
| 2,251,707 | Groene et al. | Aug. 5, 1941 |
| 2,332,381 | Hoelscher | Oct. 19, 1943 |
| 2,338,121 | Le Blond et al. | Jan. 4, 1944 |
| 2,342,105 | Jacobi | Feb. 22, 1944 |